United States Patent
Cox

(10) Patent No.: US 9,962,630 B2
(45) Date of Patent: May 8, 2018

(54) CRANELESS MGS VESSEL AND SWIVEL JOINT U-TUBE MUD LINE AND METHOD OF INSTALLATION

(71) Applicant: Camaron M. Cox, Houston, TX (US)

(72) Inventor: Camaron M. Cox, Houston, TX (US)

(*) Notice: Subject to any disclaimer, the term of this patent is extended or adjusted under 35 U.S.C. 154(b) by 0 days. days.

(21) Appl. No.: 15/205,978

(22) Filed: Jul. 8, 2016

(65) Prior Publication Data

US 2017/0009541 A1    Jan. 12, 2017

Related U.S. Application Data

(60) Provisional application No. 62/190,033, filed on Jul. 8, 2015.

(51) Int. Cl.
*B01D 19/00* (2006.01)

(52) U.S. Cl.
CPC ......... *B01D 19/0042* (2013.01); *B01D 19/00* (2013.01); *B01D 19/0036* (2013.01)

(58) Field of Classification Search
None
See application file for complete search history.

(56) References Cited

U.S. PATENT DOCUMENTS

| | | | | |
|---|---|---|---|---|
| 4,474,254 A | * | 10/1984 | Etter | E21B 21/06 175/206 |
| 8,202,336 B1 | * | 6/2012 | Moe | E21B 21/063 55/315 |
| 2011/0114389 A1 | * | 5/2011 | Mathena | E21B 21/067 174/66 |

OTHER PUBLICATIONS

Many Factors Are Involved to Properly Size Mud Gas Separator, or Gas Buster, Systems by Dan EBY, Cudd Well Control, Drilling Contractor Magazine p. 82-83, Nov./Dec. 2008, may be found at: http://www.drillingcontractor.org/many-factors-are-involved-to-properly-size-mud-gas-separator-or-gas-buster-systems-3433.

* cited by examiner

Primary Examiner — Amber R Orlando
Assistant Examiner — Phillip Y Shao
(74) Attorney, Agent, or Firm — David B. Dickinson

(57) ABSTRACT

A craneless MGS vessel and U-tube assembly can be delivered on a winch truck to a drilling site and assembled in a far shorter time and without the need of having a crane and crane operator attend to the movement and placement of the MGS vessel and attached U-tube mud lines to a mud handling system in a drilling rig. The MGS vessel of the present application can be a standard type of MGS vessel well known in the industry. By fabricating this MGS vessel with attached and moveable U-tube connectors for the mud line, the system can be moved and assembled at the drill site without crane intervention.

2 Claims, 3 Drawing Sheets

CRANELESS MGS VESSEL AND SWIVEL JOINT U-TUBE MUD LINE AND METHOD OF INSTALLATION

CROSS REFERENCE TO RELATED APPLICATIONS

None.

FIELD OF INVENTION

The present invention relates to a mud gas separator (MGS) vessel for connection to a high pressure output from a drilling operation; more specifically, to a mud gas separator connection allowing craneless operation of the MGS, often called a gas-buster, from a skid without requiring the use of a crane to move the MGS vessel or the U-tube mud line to a mud handling system on a drilling rig operation, thereby allowing fast and efficient connection and disconnection of the MGS between the high pressure input lines and the shale shaker and mud pits into which the degassed mud is returned.

BACKGROUND OF INVENTION

A typical MGS vessel is a pressure vessel allowing an input of a large volume of drilling fluid comprised of mud and entrained gas, encountered in a high pressure situation commonly referred to as a "kick," resulting when the annular hydrostatic pressure in a well falls below the pressure experienced in the well from the down hole section of the well. The high pressure gas and mud mixture is directed to the surface and pressure is relieved through an initial set of fixtures or chokes, then the mud/gas mixture is directed to the MGS vessel where the mud flows over a series of baffles on the interior of the vessel allowing gas to be released and the mud to be collected in the bottom to be returned to the shell shaker then to the mud pit. Gas is vented off the top of the MGS vessel where is can be captured or flared as required by the volume and quality of the gas experienced. The technology for this type of MGS vessel is old and well known in the art.

The use of the skidless MGS vessels and U-tube mud lines impedes successful rapid set up and completion of drill rig since each portion needs a crane to grab and set the MGS vessel adjacent the shale shaker and mud pit on a modern drill rig and then to move an attachable U-tube line to the MGS vessel when positioned. The present invention relates to an apparatus allowing a U-tube line to be shipped with the MGS vessel then be moved into alignment and connection with a mud handling system (comprised of both the connection to the shale shaker and the mud pit) by hammer unions and pipe swivel joints utilizing self-contained hydraulic power located on the skid with the MGS vessel and U-tube mud line in a manner heretofore unseen by applicant. The hydraulic lift cylinders attached to the MGS vessel and to the U-tube mud line accomplishes all required movement.

This unique adjustable mud outlet line delivery system can be adjusted to provide a liquid seal without the need of further crane operation to move the U-tube mud line for connection to the MGS vessel and the mud handling lines at the mud pit.

BRIEF SUMMARY OF INVENTION

A craneless MGS vessel is comprised of a MGS vessel mounted on a skid providing a swivel bed supporting the vessel; hydraulic means for raising the vessel from its shipping position to its operating position; a gas vent line extending from its distal end; a U-joint connecting the sump line of the vessel interposed between the sump line and mud pit line providing a swivel joint at an upper end of the U-joint and a second swivel joint at a lower end of the U-joint, spaced apart by a spacer or brace and supported by a hydraulic cylinder connecting the upper extension of the U-joint to the adjacent extended U-joint member for moving the U-joint in independent directions to connect the MGS vessel to the mud handling system of the drilling rig.

The craneless MGS vessel can be installed by moving the MGS vessel on its skid to the shaker side or trip tank of the mud system where the U-tube can be connected to the flow line, hydraulically raising the MGS vessel from its transportation horizontal position into a vertical position. The choke line and top vent lines are then connected to the MGS vessel. The U-tube mud line is hydraulically moved to connect with the mud handling system of the drilling rig, typically to the shale shaker line, then to the mud pit line.

DETAILED DESCRIPTION OF AN EMBODIMENT OF THE INVENTION

Figure 1:
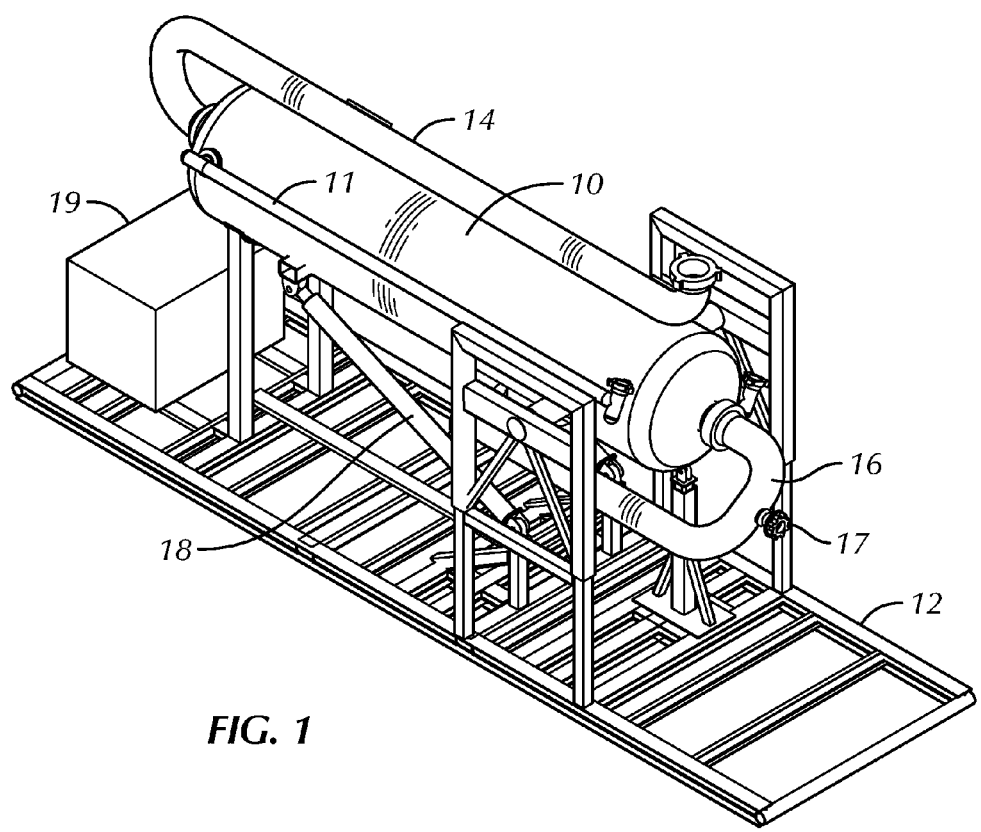
FIG. 1 is a three-dimensional perspective view of the MGS vessel in its horizontal or transport mode.

FIG. 1 is a perspective view of the MGS vessel 10 with a craneless U-tube assembly attached to the vessel mounted on skid 12 deliverable to a drilling rig site. Gas vent line 14 is attached to the top of the MGS vessel in a manner well known in the art and is designed to carry off as much of the entrained gas carried up the annulus by the drilling mud. Mud line 16 is attached to the bottom of the MGS vessel 10 again in a manner well known in the art. Hydraulic lift means 18 are installed at the fabrication shop and are connected to a source of hydraulic power contained in skid-mounted source 19. This mud line joint 16 could also contain a jet nozzle (ball valve) to allow rapid release of gas which may have reached the mud outlet to prevent it from being sent to the mud pit and a standard drain valve 17 to drain the remaining portion of mud from the tank upon completion of the circulation.

Figure 2:
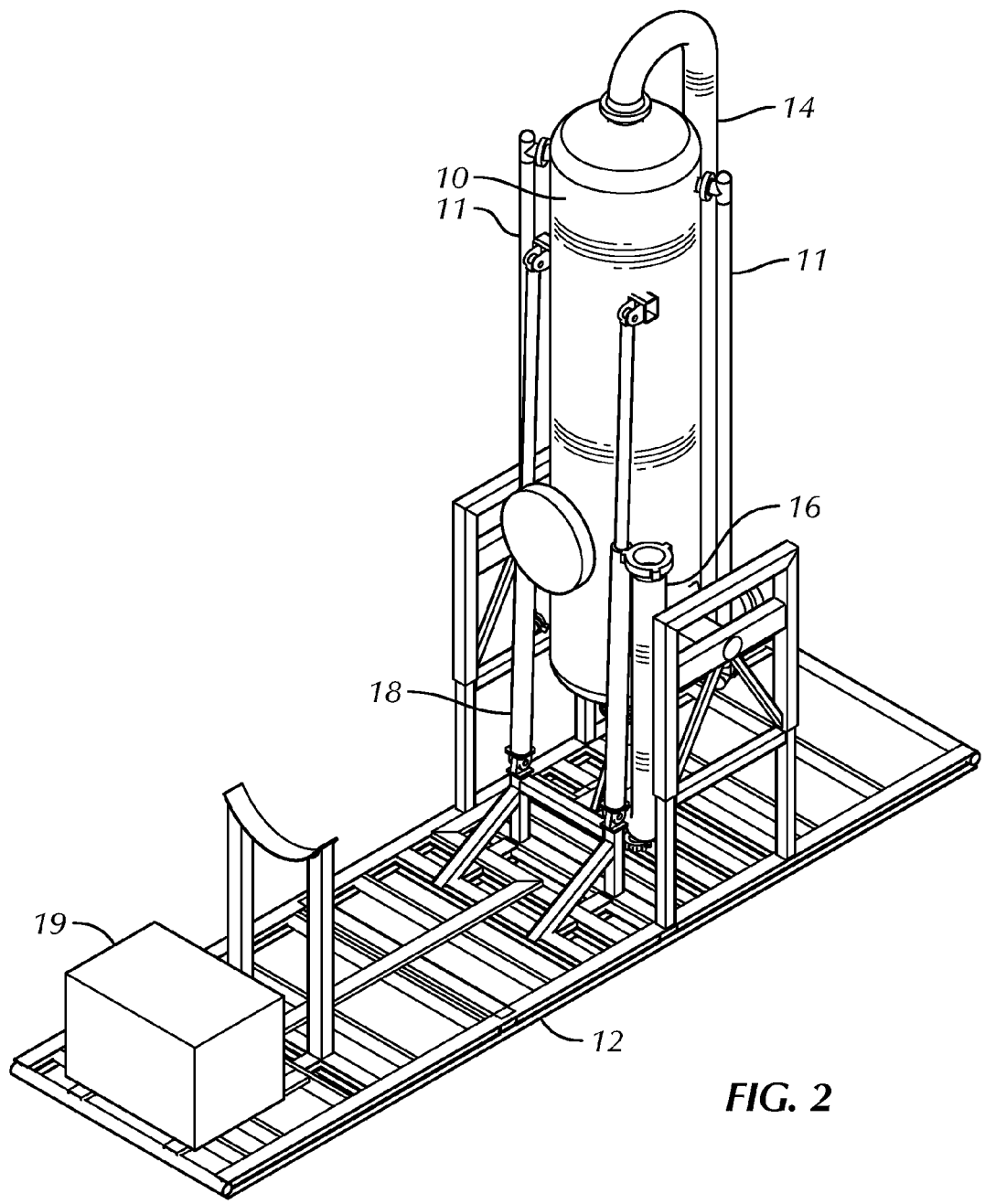
FIG. 2 is a three-dimensional perspective view of the MGS vessel in the vertical or connection mode.

FIG. 2 is a perspective view of the MGS vessel 10 after delivery and before completion of the connection to the mud pit lines (not shown). High pressure (and often multiple) inlet lines 11 take the mud/gas mixture from the choke manifold and introduce the mixture into the uppermost portion of the MGS vessel 10 allowing the mud/gas mixture to traverse the baffle plates in the MGS vessel to thereby release the entrained gas for vent through gas vent line 14 all in a manner well known in this art.

Figure 3A:
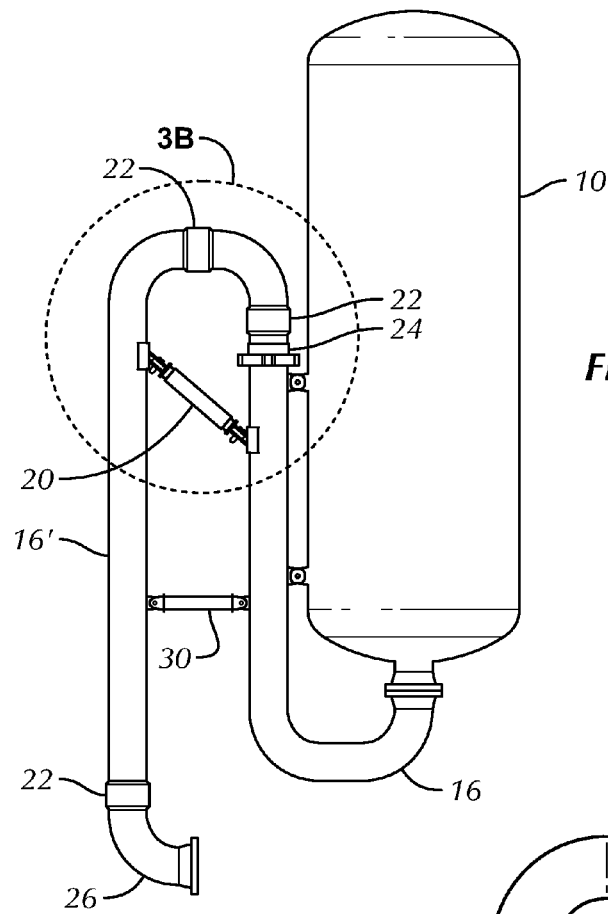
FIG. 3A is a detailed view of the U-joint connection on the mud outlet side of the MGS vessel.

FIG. 3A is a detailed view of the MGS vessel 10 connected to a mud outlet line 16 to which is attached swivel joints 22 allowing the MGS vessel mud outlet line to be connected to the mud recirculation pit on the drilling rig. Spacer 30 is disconnected from the U-joint assembly after shipment to the drilling rig site. The upper portion of the mud line 16' is then rotated by hydraulic piston 20 to its operational position to connect to the mud recirculation pit.

During shipment of the MGS vessel and attached U-joint, brace or spacer 30 holds the opposing sections 16, 16' of the U-tube in fixed position, permitting shipment without damage to either the vessel or the U-tube assembly. For installation, this brace or spacer 30 is removed or disconnected. The upper portion of U-joint 16 is fitted with a sleeve 24 connected to a hydraulic cylinder 20 capable of swiveling and lifting the upper portion of the U-tube joint 16' closer to the mud pit lines. Pipe swivels 22 are located between the lower portion of the U-tube joint 16 and the upper portion 16', and at the upper end of U-tube joint 16', thereby allowing rapid alignment with the mud system lines with the U-tube assembly. The U-joint mud line typically weighs between 350 and 575 lbs., and can not be manipulated without the use of the crane or—as described herein—the hydraulic lift arm 20 driven by the hydraulics from the delivery skid. The swivel joint 22 connected to elbow 26 at the upper end of the U-tube assembly 16' allows rapid alignment and set-up of the MGS vessel at the drilling rig site. Hammer union 28 locks the sleeve assembly 24 in place.

Figure 3B:
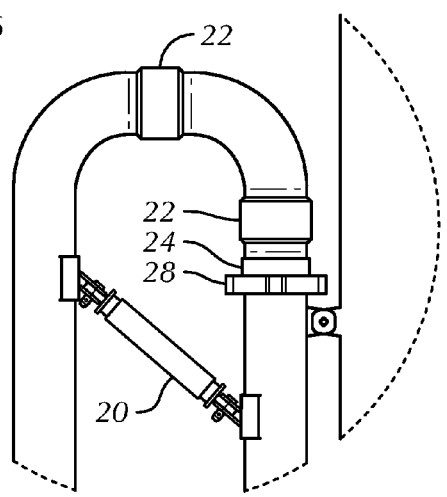
FIG. 3B is an expanded detailed view of the U-joint connection on the mud outlet side of the MGS vessel detailing the hydraulic raising cylinder and the slip joints which allow movement of the connection upon installation.

FIG. 3B is a bubbled view of the elements of the U-tube connection claimed as unique by applicant. All prior art MGS vessels known to applicant required a crane to move the MGS to either the rig floor or onto a stand located adjacent the rig floor. The present invention relates to a unique U-tube assembly, which allows the U-tube to be affixed to the MGS vessel during transportation to the drilling rig located, then installed on the drilling rig without the necessity for lifting the vessel. The combination of the swivel unions 22 with the sleeve 24 and hammer union 28 shown in this view without its other elements previously described provides a mud outlet joint 16 as shown in FIG. 3A from a bottom of the vessel 10 that can be quickly locked into place and operational, saving countless hours in set-up and therefore considerable money to the driller.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A craneless MGS vessel and U-tube assembly comprising:
    an MGS vessel mounted on a skid providing a swivel bed supporting the vessel;
    hydraulic means for raising the vessel from its shipping position to its operating position;
    a gas vent line extending from the distal end of the MGS vessel; and
    a U-joint connecting a sump line of the MGS vessel interposed between the sump line and a mud pit line providing a swivel joint at an upper end of the U-joint and a second swivel joint at a lower end of the U-joint, supported by a hydraulic cylinder connecting the upper extension of the U-joint to the adjacent extended U-joint member for moving the U-joint in an independent direction to align the U-joint with a mud handling system of a drilling rig.

2. The craneless MGS vessel and U-tube assembly of claim 1 wherein the U-joint assembly is affixed by a brace to the MGS vessel for transportation.

* * * * *